US006168052B1

(12) United States Patent
Keller

(10) Patent No.: US 6,168,052 B1

(45) Date of Patent: Jan. 2, 2001

(54) ELECTRICALLY OPERATED CARTRIDGE DISPENSING APPLIANCE

(76) Inventor: Wilhelm A. Keller, Obstgartenweg 9, CH-6402 Merlischachen (CH)

( * ) Notice: Under 35 U.S.C. 154(b), the term of this patent shall be extended for 0 days.

(21) Appl. No.: 09/310,919

(22) Filed: May 13, 1999

(30) Foreign Application Priority Data

May 15, 1998 (EP) ..................... 98810446

(51) Int. Cl.[7] ..................... G01F 11/06

(52) U.S. Cl. ..................... 222/333

(58) Field of Search ..................... 222/136, 137, 222/326, 327, 333, 390

(56) References Cited

U.S. PATENT DOCUMENTS

| | | | |
|---|---|---|---|
| 5,203,476 * | 4/1993 | Keller | 222/136 |
| 5,353,971 | 10/1994 | Vaziri | 222/326 |
| 5,464,128 | 11/1995 | Keller | 222/333 |

FOREIGN PATENT DOCUMENTS

| | | |
|---|---|---|
| 0 301 201 | 2/1989 | (EP) . |
| 0 463 990 | 1/1992 | (EP) . |
| 0 492 413 | 7/1992 | (EP) . |
| 0 607 102 | 7/1994 | (EP) . |

* cited by examiner

*Primary Examiner*—Philippe Derakshani
*Assistant Examiner*—Thach H. Bui
(74) *Attorney, Agent, or Firm*—Foley & Lardner

(57) ABSTRACT

In the electrically driven dispensing appliance, the electric drive acts via drive screws on thrust plates for dispensing material from cartridges. The drive screws are axially stationary and are in action relationship with a slide bearing said thrust plates. The drive elements which contain the slide and the drive screws are sealingly separated from the cartridge space. The different forces acting upon the two drive screws are supported by rolling friction on low friction bearings so that no tilting forces on the slide are generated. This arrangement does not require expensive longitudinal guides and their sealing. The drive elements are sealingly separated from the remaining appliance parts such as cartridges in an easy manner. The electric drive comprises a first gear motor for a drive under high load during advance and relief, and a second motor for the drive under lower load during the retracting and fast advance motions. During advance and relief, the main shaft connected to the drive screws remains always coupled to the gear motor by a coupling, said coupling being not actuated during dispensing and relief. Thus, the second motor can be a substantially smaller one, and no expensive couplings are necessary.

20 Claims, 5 Drawing Sheets

ELECTRICALLY OPERATED CARTRIDGE DISPENSING APPLIANCE

BACKGROUND OF THE INVENTION

1. Field of the Invention

The present invention refers to an electrically operated dispensing appliance in which an electromechanical drive acts upon an advance unit comprising drive screws each acting upon a thrust plate for dispensing material from at least one cartridge. In particular, the invention refers to an advance unit which is inserted as a mechanical construction unit into dispensing appliances for multicomponent compositions, as well as to the electric drive of an advance unit. Dispensing appliances are used to express different materials, filled in cartridges, through a mixing device and to dispense the mixture in metered amounts.

2. Description of the Prior Art

Electrically operated dispensing appliances are already known from U.S. Pat. Nos. 5,203,476 and 5,464,128 to the same Applicant. These appliances are essentially constructed in such a manner that a drive screw shaft advances a slide to which two thrust rods are fastened, and the material dispensing is accomplished by means of two cartridge pistons which are pressed into the corresponding cartridges.

In another, known appliance according to European Patent No. 0,492,413, the feed advance of the slide is effected by two laterally disposed chains and, in another case, by toothed racks.

These known devices have fundamental disadvantages.

The different reaction forces that are generated at different dispensing ratios load the thrust rods with high torque and cause important jamming friction and deformation forces on the slide and on the necessary guiding elements, and such appliances are expensive to be constructed and difficult to be lubricated and sealed.

In other cases, e.g. according to U.S. Pat. No. 4,180,187 where the drive screws that must be lubricated due to the high dispensing forces, are directly introduced into the cartridges, these drive elements are prone to soiling; a cleaning is difficult and impracticable for the user in the case of soiling by the materials to be dispensed. If the slide is axially moved by means of chains, there is an essential drawback in that the very slow feed speed requires a gearing having a high reduction ratio as well as a very costly high torque magnet coupling for disengaging the drive unit for the relieving and retracting strokes.

SUMMARY OF THE INVENTION

Starting from this prior art, it is a first object of the present invention to provide an electrically operated dispensing appliance comprising an advance device which overcomes the disadvantages discussed above. Another object of the invention is to provide such an appliance that presents an improved operation safety and maintenance easiness and which can be manufactured at relatively low costs.

These objects are attained by an electrically operated dispensing appliance of the above depicted kind wherein the drive screws are mounted in an axially stationary manner and coact with a slide that carries thrust plates, said drive screws and other advance elements which are disposed in said slide being spatially and sealingly separated from the cartridge space.

In already known electrically operated dispensing devices, not only the advance unit shows drawbacks but also the electric drive. In order to express the compositions contained in receptacles such as cartridges through a mixing device, for example a static mixer, high pressure forces have to be applied, and as a consequence, the cartridges that are generally made of synthetic materials will expand under this load. This cartridge pressure must immediately be relieved when the dispensing is finished since otherwise, the composition keeps flowing out of the mixer, the so-called afterflow. In order to avoid this afterflow, the advance elements are permitted to make a small relieving stroke immediately after the dispensing stroke. It is furthermore necessary that the retracting motion of this drive unit, required for a cartridge change, and the introduction of the advance elements into a partially emptied cartridge occur substantially faster than the very dispensing stroke.

The above mentioned U.S. Pat. No. 5,203,476 takes this problem into account in that the relieving stroke is effected by a mechanical axial displacement of the drive shafts by means of a toggle joint. According to U.S. Pat. No. 5,464,128, also mentioned above, the fast retracting motion as well as the relieving stroke are accomplished by a second motor and corresponding magnetic couplings.

Furthermore, it has become known from the European Patent No. 0,492,413, already cited above, to use a magnet coupling to disengage the advance drive from a chain driven thrust slide in order to allow a certain cartridge relief and a manual retracting stroke.

Starting from this prior art, it is another object of the present invention to overcome the serious drawbacks which have just been described and to provide an electromechanical drive for a dispensing appliance which can be manufactured at low cost, takes little space only and has a high reliability and maintenance easiness. This object is met by the electrically driven dispensing appliance wherein the electromechanical drive device comprises a first motor for the slow advance motion and the relieving stroke and a second motor for the fast retracting and the fast advance motions, and this appliance is characterized in that a gear motor is used for the high loaded dispensing and relieving strokes and a second motor is used for the low loaded fast retracting and advance motions, a main shaft connected to the drive screws being permanently coupled to the gear motor during the slow advance and relieving strokes.

BRIEF DESCRIPTION OF THE DRAWINGS

The invention is explained in more detail hereinafter with reference to drawings of embodiments.

DETAILED DESCRIPTION OF THE INVENTION

Figure 1:
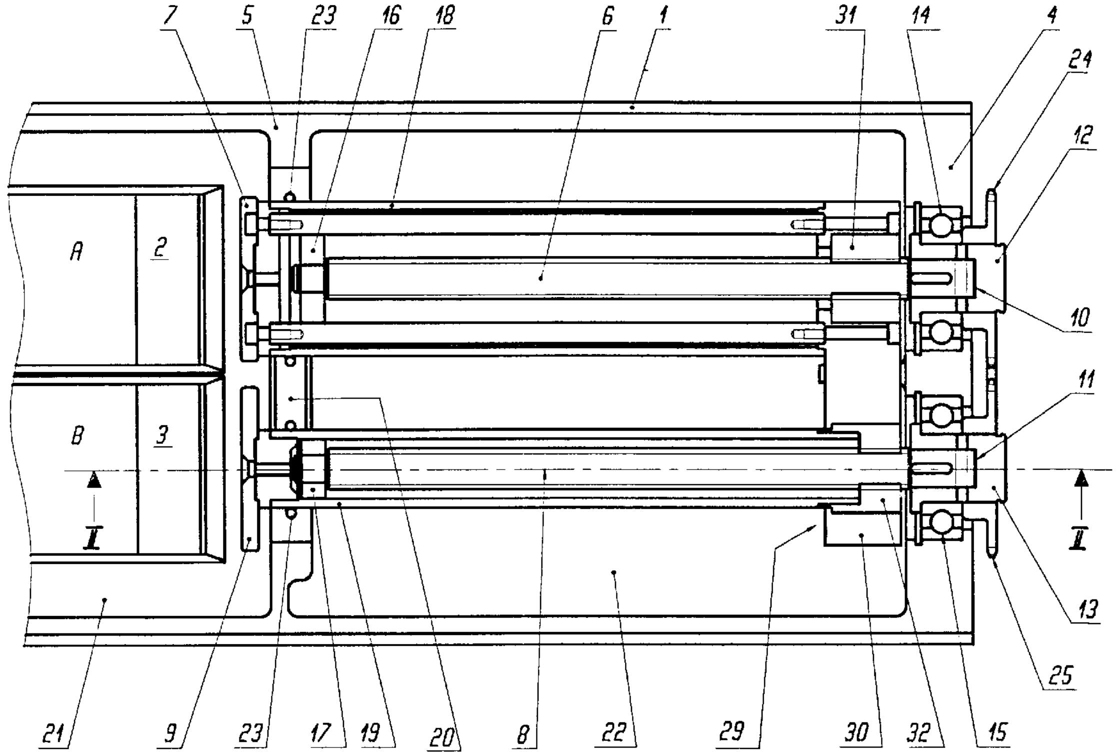
FIG. 1 shows a sectional view according to line I—I in FIG. 3 of a first embodiment of an advance unit according to the invention in a dispensing appliance.

FIG. 1 shows the frame 1 of the dispensing appliance and frontally, i.e. at the cartridge side, a cartridge A having a piston 2, and a cartridge B with its piston 3. At the drive side, i.e. towards the rear, the frame 1 has a rear closure wall 4, and at the cartridge side a frontal wall 5; a drive being journalled and guided within these two frame parts. The advance unit contains a first driving screw 6 bearing a first thrust plate 7 for cartridge A and a second driving screw 8 bearing a second thrust plate 9 for cartridge B. Both driving screws are rigidly disposed in axial direction; they are axially and radially journalled and supported in the rear closure wall 4 by thrust surfaces 10 and 11, respectively, on support bushings 12 and 13, respectively, the latter acting on ball or thrust bearings 14 and 15, respectively.

The drive screws 6 and 8 are radially journalled and supported at their front end on guiding pistons 16 and 17, respectively, and the latter are journalled in ram tubes 18 and 19, respectively. The ram tubes 18 and 19 are guided in wall 5 by a first guide 20.

The cartridge space 21 is sealed against the drive space 22 by sealing elements 23. The driving screws 6 and 8 are synchronously driven by chain wheels 24 and 25 through a chain 26 actuated by a chain wheel 28 on the shaft 27, see FIG. 3.

The movement advances a guiding bridge 29. The guiding bridge is comprised of a second guide the ram tubes 18 and 19 and the thrust plates 7 and 9. The second guide 30 is comprised of two screw sockets 31 and 32. The thrust plates 7 and 9 express the media to be dispensed by means of the cartridge pistons into and through a mixer. The second guide 30 and thrust plate 7 on the cartridge side A are screwed by connecting rods and screws in such a manner that the thrust pressure is fully taken over by the ram tube 18. The ram tube 19 on the cartridge side B is screwed or pressed into the second guide 30. The different diameter of the ram tubes 18 and 19 in this drawing results from the different dispensing ratios; both ram tubes 18 and 19 may however, be of the same diameter.

The same guiding bridge may be used for several dispensing ratios, e.g. from 1:1 to 5:1 or even higher. Only the thrust plates 7 and 9 have to be adapted to the cartridge diameter. Different dispensing ratios and cartridge diameters require different dispensing forces. These are supported, independently for each side, by the torsion resistant frame 1 by rolling friction over the driving second screws 6 and 8 and the screw sockets 31 and 32. Therefore, the costly longitudinal guides of the normally used guiding bridges with their friction, tilting, lubrication and sealing problems are no longer needed. A particular advantage is that the driving screws and screws 6 and 8 screw sockets 31 and 32 which require a good lubrication because of the high axial forces are totally separated and sealed from the remaining appliance units such as driving means, electronic devices and the cartridge space.

Figure 2:
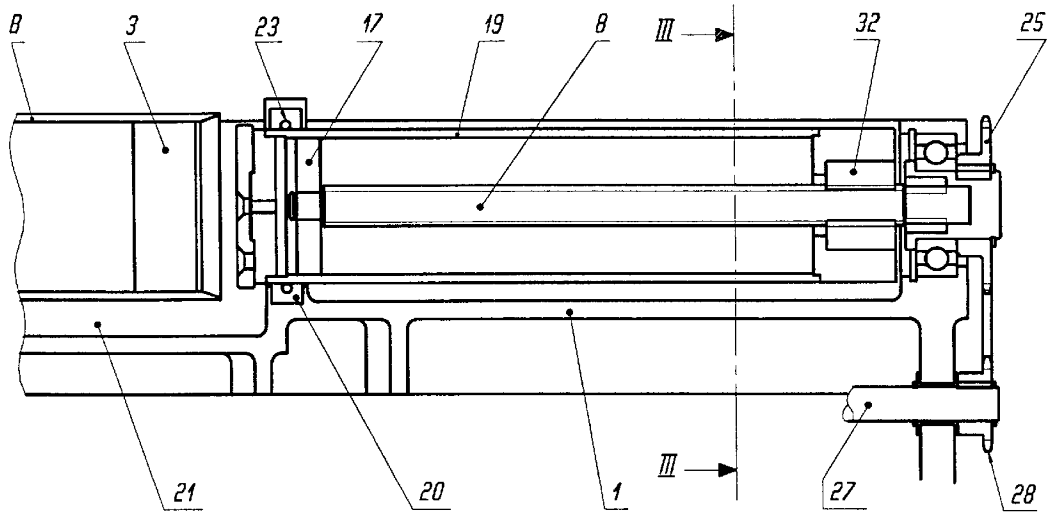
FIG. 2 shows a cross-section according to line II—II in FIG. 1.
Figure 3:
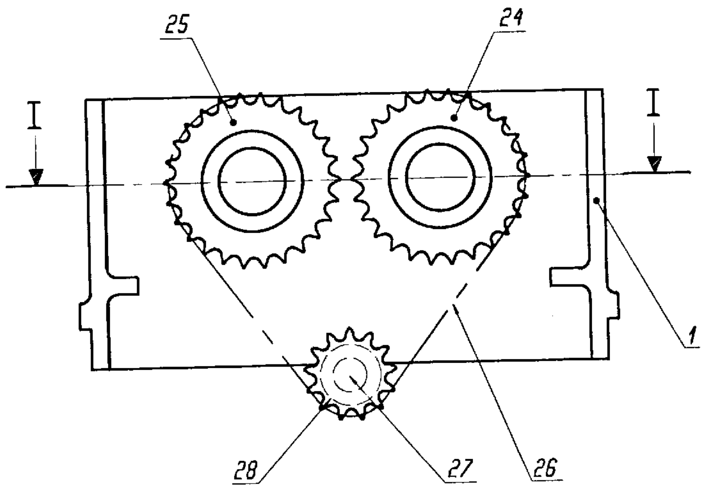
FIG. 3 shows a cross-section according to line III—III in FIG. 2.
Figure 4:
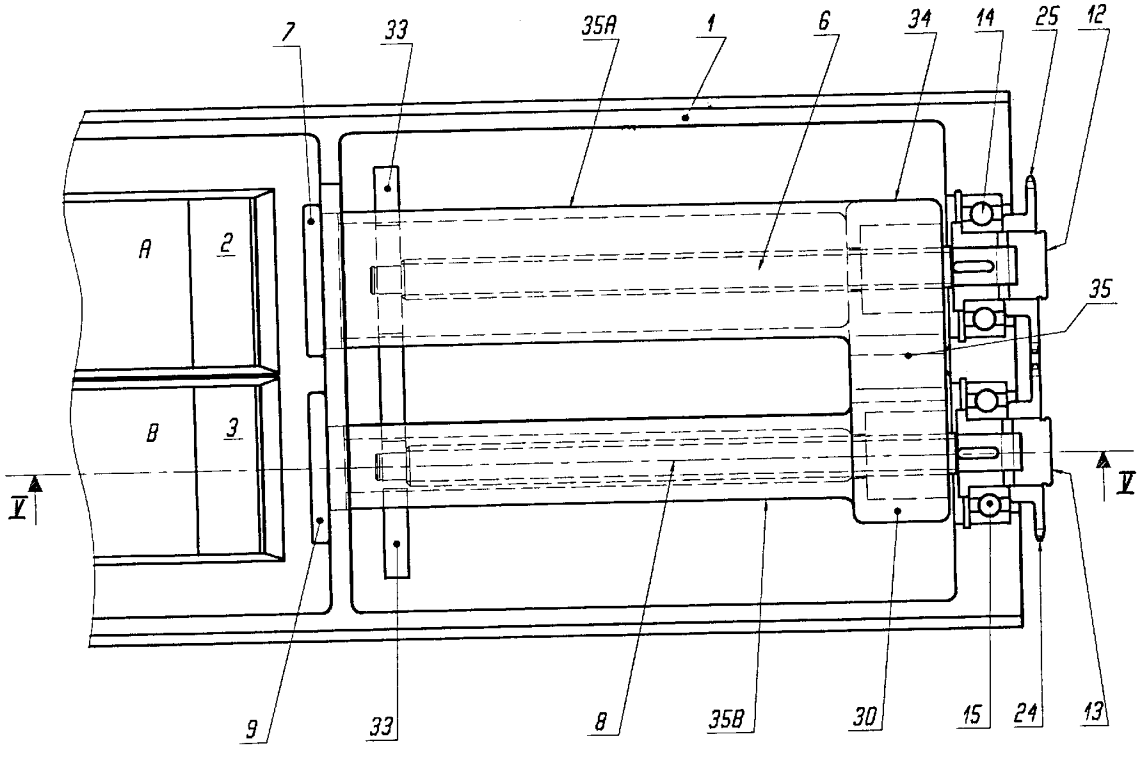
FIG. 4 shows, as a cross-section according to line IV—IV in FIG. 6, a variant of the embodiment of FIG. 1.
Figure 5:
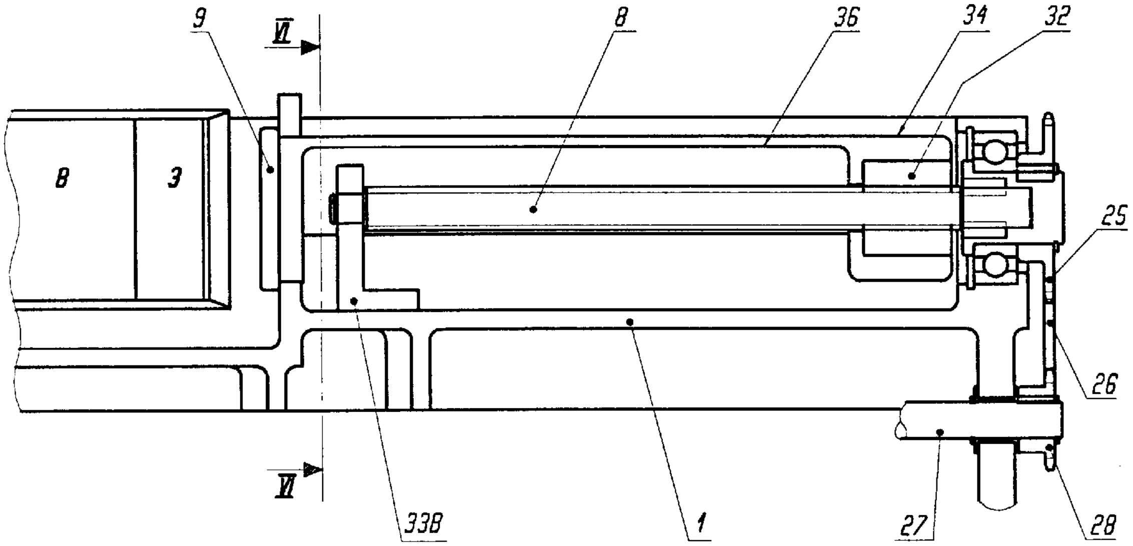
FIG. 5 shows a cross-section according to line V—V in FIG. 4.
Figure 6:
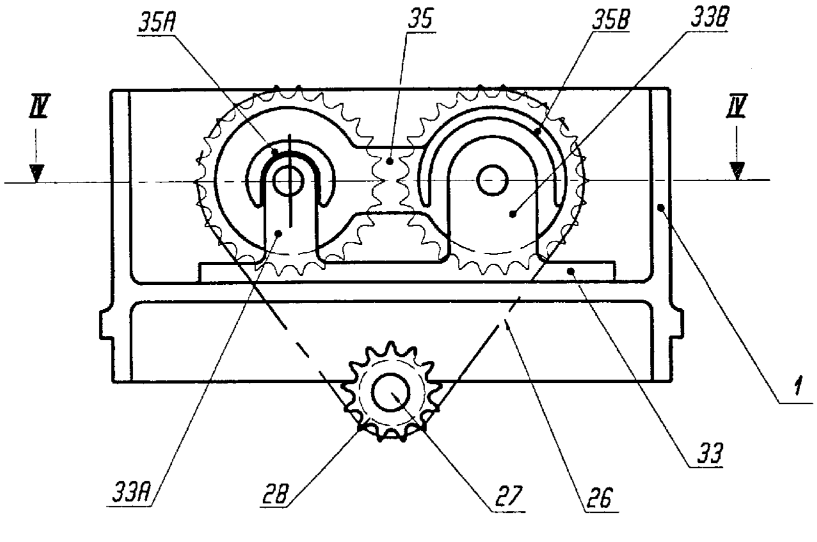
FIG. 6 shows a cross-section according to line VI—VI in FIG. 5.

FIGS. 4 to 6 show an embodiment which is similar to the first described embodiment according to FIGS. 1 to 3, the same or similar parts bearing the same reference numerals where possible. In contrast to the first embodiment, the driving screws 6 and 8 are frontally journalled and supported in supports 33, 33A and 33B which are directly fastened in the frame 1; this can be seen particularly in FIGS. 5 and 6. The guide 34 consists as an integral part of the guiding bridge 35 and the thrust pieces 35A and 35B to which the thrust plates 7 and 9 are screwed. The guiding bridge 35, the guide 34, and the thrust pieces 35A and 35B, must be open at their lower region for allowing the passage of the support 33A and 33B.

The advance units described above are not bound to a special execution of the electrical drive.

Figure 7:
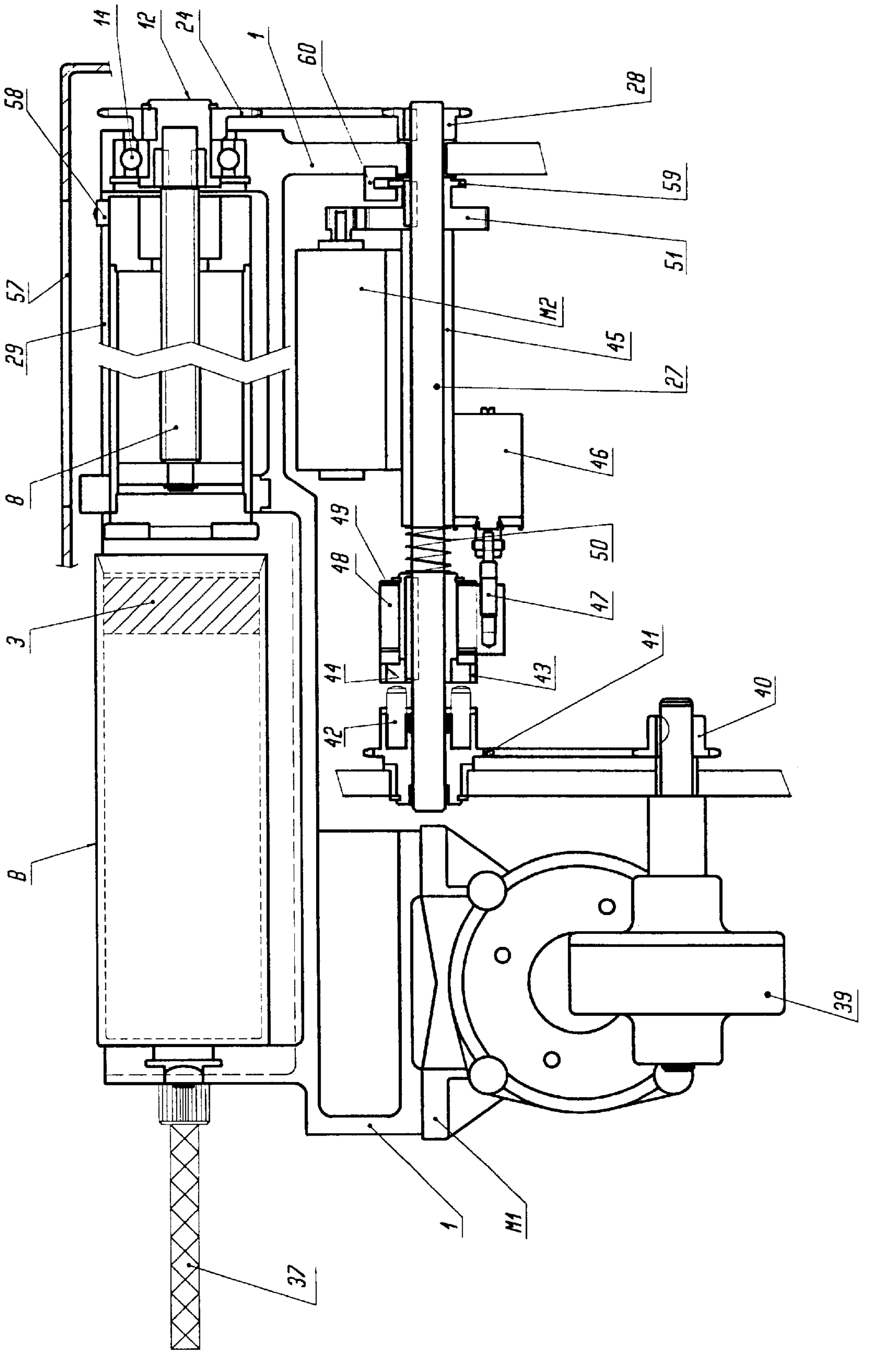
FIG. 7 shows an embodiment of a dispensing appliance according to the invention with its electrical drive as a cross-section according to line VII—VII in FIG. 9.

FIG. 7 shows, in a schematical manner, a sectional view of the whole dispensing appliance according to the invention; one distinguishes the elements of the advance unit already described above, and the cartridge B with its cartridge piston 3 and a mixer 37 frontally attached thereto.

Figure 8:
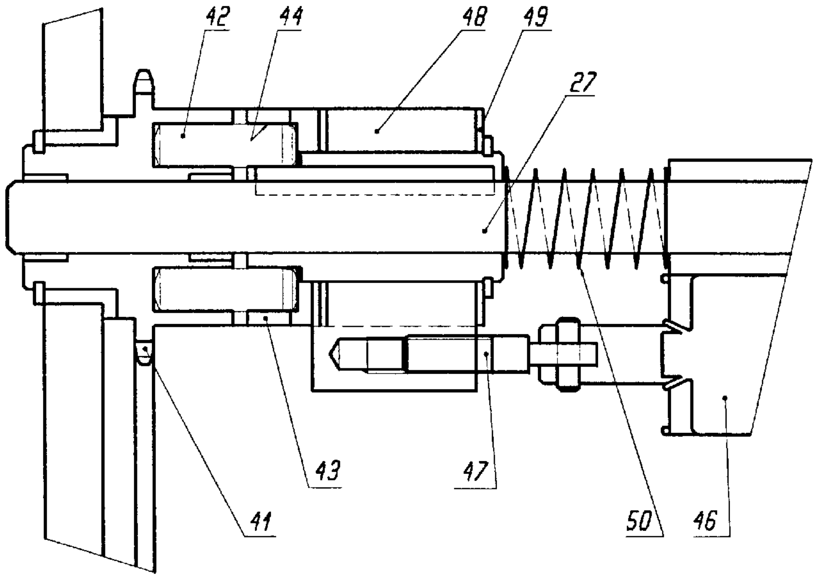
FIG. 8 shows as an enlarged portion a detail of the electrical drive of FIG. 7 in another position.

A gear motor Ml, flange-mounted to the frame 1, drives a worm gear pair 39 which actuates, by a first chain wheel 40, a second chain wheel 41 which is freely rotatable on the main or driving shaft 27 and which bears driving pins 42. However, other coupling means than pins may be provided such as cams or similar devices. Besides the second chain wheel 41, a shifting sleeve 43 which is wedged in radial direction but displaceable in axial direction is journalled on the main shaft 27. In FIG. 8, the driving pins 42 of the second chain wheel 41 are engaged in corresponding borings 44 of the shifting sleeve. The driving pins or driving cams may alternatively be mounted on the shifting sleeve and engaged into corresponding borings of the chain wheel. Still other connecting or control elements between the chain wheel and the shifting sleeve may be contemplated.

If the shifting sleeve is engaged as it is shown in FIG. 8, the main shaft 27 is driven with the rotational speed of the chain wheel 41. The chain wheel 28 which is wedged to the main shaft thus drives via further chain wheels 24 and 25 the two driving screws 6 and 8, and as a result, the guiding bridge 29 or 35, respectively, is advanced. This electrical drive allows to actuate at will only one or even several driving screws.

The main shaft 27 further comprises a support 45 which is secured against rotation with respect to the frame 1 and which cannot be displaced in axial direction. This support 45 carries an electromagnet 46 whose armature 47 is connected to a slider 48 that is journalled on the shifting sleeve. When the magnet is energized, it displaces the shifting sleeve from its engaged position (see FIG. 8) into the disengaged position (see FIG. 7) and keeps this position during the relieving stroke and the fast advance stroke. The slider 48 abuts against a disk 49 at the end of the shifting sleeve; the slider 48 is thus displaceable in lengthwise direction but is not rotatable.

The shifting sleeve 43 is loaded by a pressure spring 50, disposed on the main shaft 27, and the spring pushes the shifting sleeve into its engaged position according to FIG. 8 when the electromagnet 46 is deenergized.

In the embodiment according to FIG. 7, the support 45 carries a second motor M2 which is sensibly smaller than the gear motor Ml. A toothed belt gear 51 is mounted between the motor M2 and the main shaft 27; it is also possible to use a toothed wheel gearing.

Figure 9:
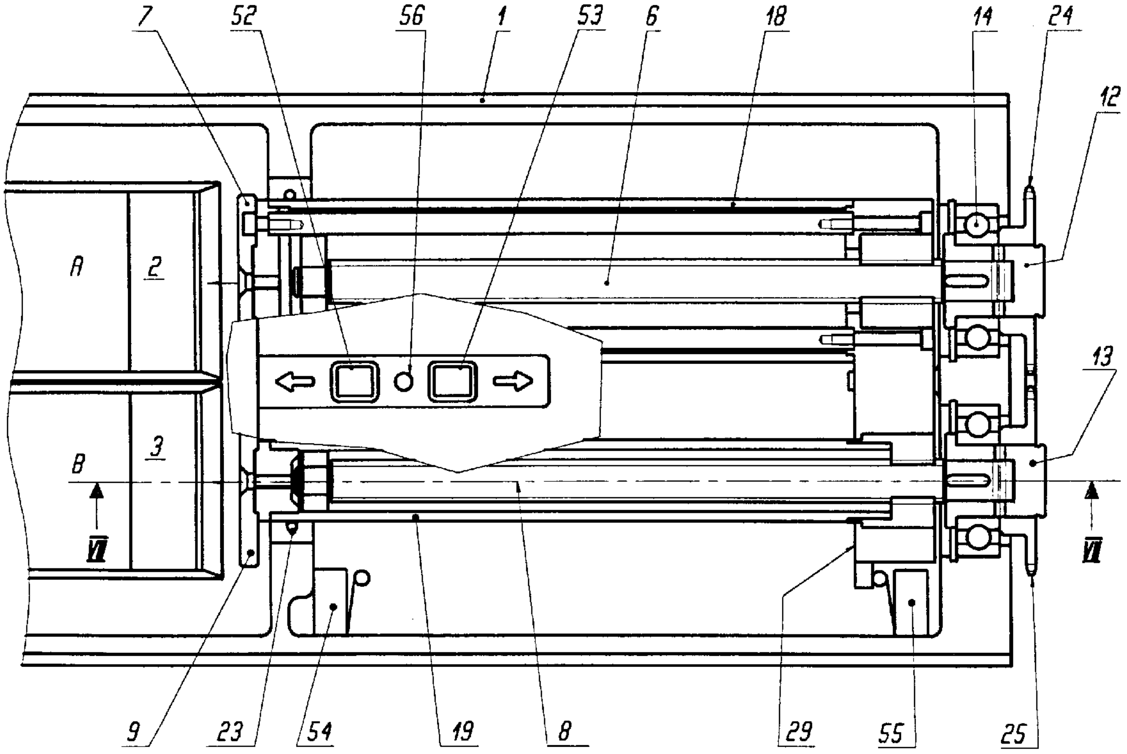
FIG. 9 shows further details of the dispensing appliance according to the invention.

Since each advance stroke is automatically followed by a relief stroke, cartridge pressure forces do no longer act on the guiding bridge 29, and the fast retracting stroke can be started without resistance. This stroke is automatically executed when the front switch 54, see FIG. 9, is closed. This switches the electromagnet and the motor M2 on, the main shaft 27 is driven by the toothed belt gear 51, and the driving screws 6, 8 and thus the guiding bridge 29 are actuated by means of the chain wheels 28, 24 and 25. When the retracting stroke is finished, the rear switch 55 is actuated, and the motor M2 and the electromagnet are deenergized.

The pressure spring 50 then pushes the shifting sleeve against the second chain wheel 41, and the engagement is effected as soon as the radial positions of driving pins and the corresponding borings are lined up; this occurs when the gear motor M1 is switched on for a new dispensing stroke, the gear motor M1 rotating in a slow gear until the coupling is effected in order to facilitate the engagement motion.

In contrast to already known solutions, the relieving stroke is carried out by the advance motor with increased rotational speed, and not by the retracting stroke motor. High torques at slow speeds are required for the advance movement and the very beginning of the relief stroke, e.g. for the first millimeter of the driving screw return movement, since the driving screws are still under high load. On the other hand, the retracting stroke and the fast advance movement require higher speeds at lower torques.

This arrangement, namely the division of the drives into a relatively slow drive under high torques and a relatively fast drive under low torques, permits to use two appropriate, specially adapted motors and saves costly couplings for high torques. The fact that the relieving stroke is started after the end of the advance stroke without actuation of a coupling is of outstanding practical importance. Furthermore, the present arrangement allows to shut down the fast advance movement in the case of an operating error without overloading the device parts, for example if one tries to start the advance against an obstructed mixer or another hard obstacle.

FIG. 9 shows, in addition to the elements already described with reference to FIG. 1, some operating parts. The key 52 starts, when pressed down, the dispensing and when released, the relieving stroke. In order to keep the time duration of the relieving stroke short, the gear motor M1 is controlled during the starting phase, for example the first millimeter of the relieving stroke, for a low speed at a high torque and during the next 2 to 3 mm for a higher speed and a correspondingly lower torque. When the key 53 is pressed down, the retracting movement is started by actuating the electromechanical coupling and switching the retracing motor M2 on, as already described above.

The front switch 54 indicates that the content of the cartridge is fully dispensed, and automatically starts the retracting motion. The rear switch 55 ends the retracting motion and indicates by lighting the pilot lamp 56 that the empty cartridge is to be replaced. A scanner disk 59 with photoelectric barrier 60 (FIG. 7) allows to carry out different controls such as the switching off of the motor at crash stops or when the mixer contains hardened products, and the adjustment at different viscosities of the material to be dispensed. The electric components and motors are connected to a correspondingly designed control circuitry.

FIG. 7 further shows a level indicator having a sight window 57; a lamp 58 fixed to the guiding bridge 29 or 35 is guided along a scale and thus shows the filling level of the cartridge(s).

As it can be understood from this description, the present electric drive unit for dispensing appliances of multicomponent compositions has been designed such that a sharp separation has been introduced between advance and relief stroke under high torques and low speeds, on one hand, and fast retracting and fast advance motions under substantially lower torques but by far higher speeds. This allows to use, instead of a magnet coupling that is very costly for high torques, a low-cost mechanical coupling which never needs to be actuated during the dispensing and the relieving strokes, the resulting operation noises and the wear problems being of little importance since the coupling is actuated at the cartridge change only and not, as in known appliances, at each dispensing stroke.

Instead of the disclosed chain wheels and chains other toothed transmission elements can be used, for example toothed belt wheels and toothed belts, in particular where high shaft speeds are prevailing, namely at the fast retracting and advance motions, and for further to minimize the operating noise.

Although the described electric drive has particular advantages in the appliance comprising the described advance unit, the drive may also be used in appliances equipped with other advance units or for cartridges having one or several cylinders.

What is claimed:

1. An electrically operated dispensing appliance comprising:

a frame;

a first thrust plate for a first cartridge and a second thrust plate for a second cartridge;

a first drive screw and a second drive screw mounted in an axially stationary manner to the frame, the first drive screw and the second drive screw acting respectively on the first thrust plate and the second thrust plate;

an electromechanical device to drive the first and second drive screws; and a guiding bridge movable by said first and second drive screws;

wherein each of the first and second drive screws have a front end portion that is journalled in a support mounted to the frame.

2. The dispensing appliance according to claim 1, wherein the first and second drive screws are spatially and sealingly separated from the first and second cartridges.

3. The dispensing appliance according to claim 1, wherein the first and second drive screws have respective rear end portions that are radially and axially journalled and supported in the frame by thrust surfaces on respective first and second support bushings, which first and second bushings act on ball or pressure bearings.

4. The dispensing appliance according to claim 1, wherein said electromechanical device acts synchronously on respective rear end portions of the first and second drive screws.

5. The dispensing appliance according to claim 1, wherein said support is at least two guiding pistons and wherein said guiding pistons are journalled in ram tubes that are guided in a wall of the frame by the guiding bridge.

6. The dispensing appliance according to claim 1, wherein said support is at least one bearing, wherein said guiding bridge does not come into contact with said bearing while said first and said second drive screws act on said first and said second thrust plates, and wherein said guiding bridge connects the first and second thrust plates via a first and a second thrust piece respectively.

7. The dispensing appliance according to claim 1, wherein the first cartridge and the second cartridge have equal diameters.

8. The dispensing appliance according to claim 1, wherein the first cartridge and the second cartridge have unequal diameters.

9. The dispensing appliance according to claim 1, wherein the electromechanical device is comprised of:

a drive shaft connected to said first and said second drive screws;

a first motor for a high loaded, slow advance stroke and a relieving stroke, said drive shaft being permanently coupled to said first motor during the high loaded slow advance motion and relieving stroke; and a second motor connected to said driving shaft for a low loaded, fast retracting stroke and a fast advance stroke.

10. The dispensing appliance according to claim 9, wherein the first motor is a gear motor.

11. The dispensing appliance according to claim 9, wherein said drive screws are disengageable from said first motor by means of a slider actuated by an electromagnet for uncoupling said first motor after said relieving stroke and for switching on said second motor for said low loaded fast retracting stroke or said fast advance stroke, wherein said slider is loaded by a pressure spring for a reengagement of said drive screws to said first motor.

12. The dispensing appliance according to claim 9, wherein said first motor is connected to said driving shaft via a gearing and a first and a second transmission wheel, and wherein said second transmission wheel is freely rotatable on said driving shaft.

13. The dispensing appliance according to claim 9, wherein said second motor is connected to said driving shaft via a reduction gear.

14. A dispensing appliance electrically driven by a electromechanical drive device, said electromechanical drive device comprising:

drive screws that act on a dispensing element;

a driving shaft connected to said drive screws;

a first motor for a high loaded, slow advance stroke and a relieving stroke, said driving shaft being permanently coupled to said first motor during the high loaded slow advance motion and relieving stroke; and a second motor connected to said driving shaft for a low loaded, fast retracting stroke and a fast advance stroke.

15. The dispensing appliance according to claim 14 wherein said first motor is a gear motor.

16. The dispensing appliance according to claim 14, wherein said drive screws are disengageable from said first motor by means of a slider actuated by an electromagnet for uncoupling said first motor after said relieving stroke and for switching on said second motor for said low loaded fast retracting stroke or said fast advance stroke, wherein said slider is loaded by a pressure spring for a reengagement of said drive screws to said first motor.

17. The dispensing appliance according to claim 14, wherein the first motor is connected to said driving shaft via a gearing and first and second transmission wheels, the second transmission wheel being freely rotatable on said driving shaft and wherein the second motor is connected to said driving shaft via a reduction gear.

18. The dispensing appliance according to claim 14, wherein the drive screws are frontally journalled in guiding pistons attached to the frame, said guiding pistons being journalled in ram tubes, said ram tubes being journalled in a guiding bridge in a wall in a frame.

19. The dispensing appliance according to claim 16, further comprising an electric circuit for switching said first motor to a slow gear during said reengagement of said drive screws to said first motor.

20. The dispensing appliance according to claim 15, wherein the drive screws are driven by a drive acting on their rear end and being designed for a synchronous drive of said drive screws.

* * * * *